United States Patent
Fetta et al.

(10) Patent No.: US 10,144,529 B1
(45) Date of Patent: Dec. 4, 2018

(54) DISPLAY SYSTEM WITH INTEGRATED AVIONICS PLATFORM

(71) Applicants: Jeffery E. Fetta, Cedar Rapids, IA (US); Richard T. Hackett, Anamosa, IA (US); Eric N. Anderson, Cedar Rapids, IA (US)

(72) Inventors: Jeffery E. Fetta, Cedar Rapids, IA (US); Richard T. Hackett, Anamosa, IA (US); Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 425 days.

(21) Appl. No.: 14/845,677

(22) Filed: Sep. 4, 2015

(51) Int. Cl.
  *B64D 43/00* (2006.01)
  *G06F 3/14* (2006.01)

(52) U.S. Cl.
  CPC .......... *B64D 43/00* (2013.01); *G06F 3/1438* (2013.01); *G06F 3/1446* (2013.01)

(58) Field of Classification Search
  None
  See application file for complete search history.

(56) References Cited

U.S. PATENT DOCUMENTS

| | | | | |
|---|---|---|---|---|
| 6,148,261 | A * | 11/2000 | Obradovich | G01C 21/20 340/286.01 |
| 2004/0119748 | A1 * | 6/2004 | Kopitzke | B64D 11/00 715/764 |
| 2008/0259096 | A1 * | 10/2008 | Huston | G06Q 50/01 345/659 |
| 2010/0030405 | A1 * | 2/2010 | He | G01C 23/00 701/14 |
| 2012/0019781 | A1 * | 1/2012 | Kuhlman | B60K 35/00 353/13 |
| 2015/0276409 | A1 * | 10/2015 | Dhulipudi | G01C 21/00 701/3 |
| 2016/0019188 | A1 * | 1/2016 | Zulch, III | G06F 3/0483 715/227 |

OTHER PUBLICATIONS

U.S. Appl. No. 14/298,275, filed Jun. 6, 2014, Fetta et al.

* cited by examiner

*Primary Examiner* — Redhwan K Mawari
(74) *Attorney, Agent, or Firm* — Angel N. Gerdzhikov; Donna P. Suchy; Daniel M. Barbieri

(57) ABSTRACT

Systems and methods for providing Integrated Modular Avionics (IMA) processing and input/output (I/O) capabilities to existing electronic systems onboard aircraft are disclosed. More specifically, a display processing computer may include a first set of I/O interfaces and a second set of I/O interfaces. The display processing computer may further include at least one first processor in communication with the first set of I/O interfaces and at least one second processor in communication with the second set of I/O interfaces. The at least one first processor may be configured to process data received at the first set of I/O interfaces and provide commands to control a display. The at least one second processor may be configured to provide a set of non-display functions, and further configured to selectively activate a subset of the set of non-display functions based on at least one operating condition of the display processing computer.

8 Claims, 3 Drawing Sheets

DISPLAY SYSTEM WITH INTEGRATED AVIONICS PLATFORM

BACKGROUND

An electronic flight instrument system (EFIS) is an instrument display system in which the display technology used is electronic rather than mechanical or electromechanical. In addition to electronic flight instrument systems, other electronic systems have also been developed to replace their mechanical or electromechanical counterparts in modern airborne vehicles. These electronic systems are commonly referred to as avionics.

Recent development in avionics introduced the concept of Integrated Modular Avionics (IMA), which refers to an integrated platform that may include a number of computing modules capable of supporting a variety of applications. It is noted, however, that certain aircraft designs cannot take the advantages provided by the IMA platform due to various concerns, including weight, space availability, power consumption, cost, as well as other factors.

SUMMARY

In one aspect, embodiments of the inventive concepts disclosed herein are directed to a display processing computer. The display processing computer may include a first set of input/output (I/O) interfaces and a second set of I/O interfaces operationally separated from the first set of I/O interfaces. The display processing computer may further include at least one first processor in communication with the first set of I/O interfaces and at least one second processor in communication with the second set of I/O interfaces. The at least one first processor may be configured to process data received at the first set of I/O interfaces and provide commands to control a display in communication with the at least one first processor. The at least one second processor may be configured to provide a set of non-display functions, and further configured to selectively activate a subset of the set of non-display functions based on at least one operating condition of the display processing computer.

In a further aspect, embodiments of the inventive concepts disclosed herein are directed to a display. The display may include a display processing computer configured to control the display. The display processing computer may include a first set of I/O interfaces and a second set of I/O interfaces operationally separated from the first set of I/O interfaces. The display processing computer may further include at least one first processor in communication with the first set of I/O interfaces and at least one second processor in communication with the second set of I/O interfaces. The at least one first processor may be configured to process data received at the first set of I/O interfaces and provide commands to control a display in communication with the at least one first processor. The at least one second processor may be configured to provide a set of non-display functions, and further configured to selectively activate a subset of the set of non-display functions based on at least one operating condition of the display processing computer.

In another aspect, embodiments of the inventive concepts disclosed herein are directed to a method. The method may include: providing a first set of I/O interfaces and at least one first processor in communication with the first set of I/O interfaces to process data received at the first set of I/O interfaces and provide commands to control a display in communication with the at least one first processor; providing a second set of I/O interfaces and at least one second processor in communication with the second set of I/O interfaces to provide a set of non-display functions; integrating the first set of I/O interfaces, the second set of I/O interfaces, the at least one first processor, and the at least one second processor to form a single line-replaceable unit (LRU); and configuring the at least one second processor to selectively activate a subset of the set of non-display functions based on at least one operating condition of the LRU.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to systems and methods for providing Integrated Modular Avionics (IMA) processing and input/output (I/O) capabilities to existing electronic systems onboard aircraft. More specifically, an exemplary electronic system may include one or more electronic displays and one or more display processing computers configured to control operations of the electronic displays. The display processing computers may be configured to receive signals from various sensors/devices and control the electronic displays to display the information received. The display processing computers may also be configured to provide support for various non-display applications/tasks, allowing the aircraft to take the advantages provided by the IMA platform without having to install dedicated IMA units.

Figure 1:
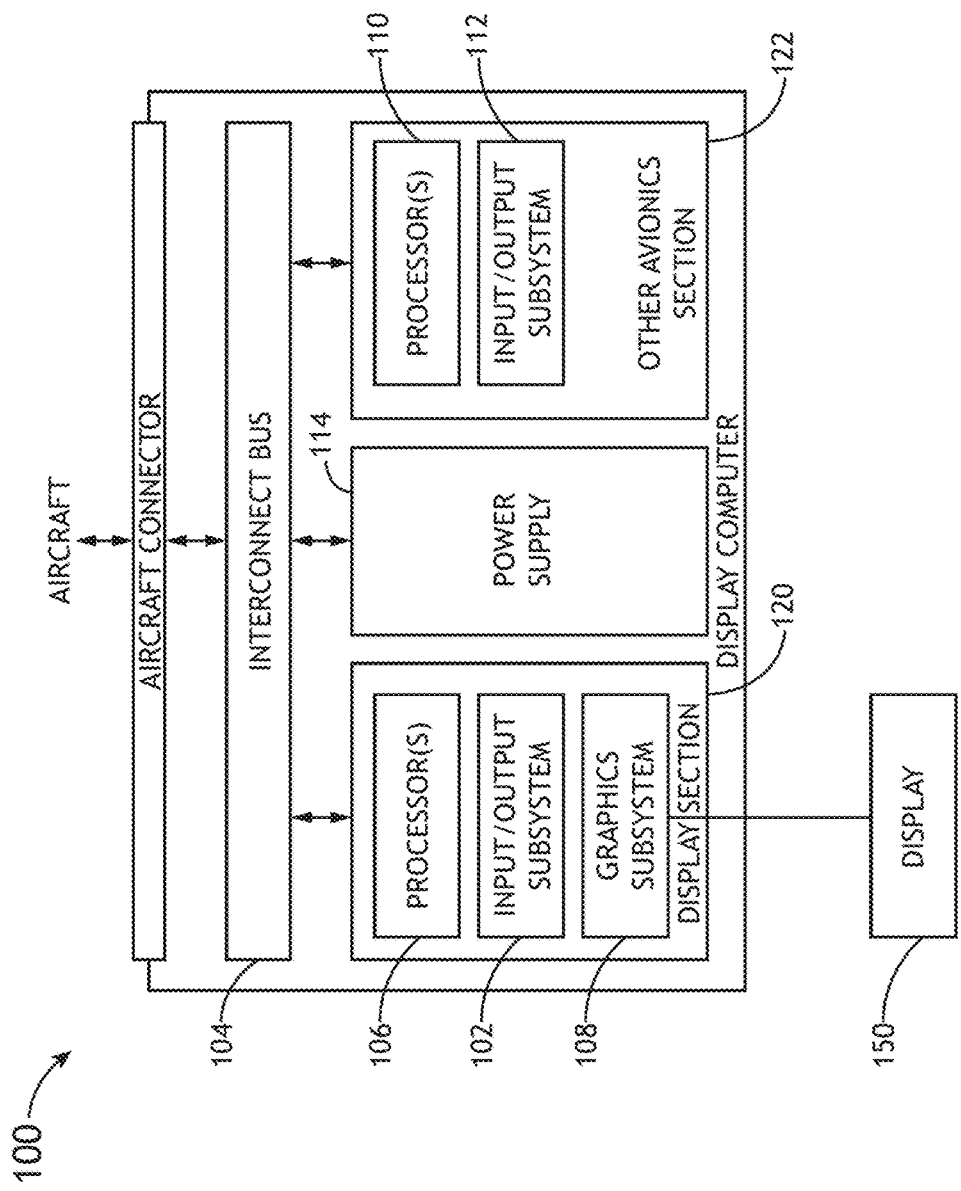
FIG. 1 is a block diagram depicting a display processing computer according to an exemplary embodiment of the inventive concepts disclosed herein.

Referring to FIG. 1, a simplified block diagram depicting a display processing computer (DPC) 100 configured according to an exemplary embodiment of the inventive concepts disclosed herein is shown. The DPC 100 may include an I/O subsystem 102 that provides a set of I/O interfaces configured to facilitate data communications with other electronic systems and/or devices on board the aircraft via one or more data buses 104. The DPC 100 may also include one or more processors 106 configured to process the data and provide commands to a graphics subsystem 108 to control a display 150 onboard the aircraft. It is contemplated that the one or more processors 106 may be implemented as dedicated processing devices, application-specific integrated circuits (ASICs), field-programmable gate arrays (FPGAs) or various other types of processors or processing devices. It is also contemplated that the I/O subsystem 102 may support various types of avionics interfaces, including network interfaces (such as that described in the ARINC 664 specification), unidirectional wiring interfaces (such as that described in the ARINC 429 specification), digital interfaces, analog interfaces, discrete interfaces and the like.

It is to be understood that the display 150 and the DPC 100 are shown as separate blocks in FIG. 1 merely for illustrative purposes. It is contemplated that in certain implementations, the display 150 and the DPC 100 may be physically separated components, where the display 150 may be positioned on the flight deck of the aircraft while the DPC 100 may be positioned within the aircraft's electronics and equipment bay. In certain alternative implementations, however, the DPC 100 may be configured as an integrated component of the display 150, in which case the DPC 100 is not required to be located in the electronics and equipment bay of the aircraft. Therefore, it is to be understood that specific locations of the display 150 and the DPC 100 may vary without departing from the broad scope of the inventive concepts disclosed herein.

The DPC 100 configured in accordance with the inventive concepts disclosed herein may also include hardware components that are configured to provide additional non-display functions. More specifically, as shown in FIG. 1, the DPC 100 may include additional processor(s) 110 and I/O subsystem(s) 112 that jointly form an integrated portion of the DPC 100. For illustrative purposes, the portion of the DPC 100 that provides control for the display system may be referred to as the display control portion 120 and the portion of the DPC 100 that provides the non-display functions may be referred to as the non-display function portion 122. It is contemplated that the non-display function portion 122 may be configured to provide a variety of functions, including IMA functions such as data concentration, datalink management, flight warning applications, flight management, navigation, flight deck access control, utility power management (e.g., galley power or the like), secondary power management, smoke detector monitoring, window heating control, maintenance and health monitoring, as well as various other functions not explicitly listed above without departing from the broad scope of the inventive concepts disclosed herein.

It is noted that while the DPC 100 configured in accordance with the inventive concepts disclosed herein may be implemented as a single integrated line-replaceable unit (LRU), data and process segregation may nonetheless be enforced between the display control portion 120 and the non-display function portion 122 so that each portion 120/122 is independently capable of high integrity processing and handling of critical data, and that third party applications can be developed and deployed on the non-display function portion 122 of the DPC 100 without impacting the hardware and/or the software utilized by the display control portion 120 of the same DPC 100. For instance, in certain implementations, the display control portion 120 and the non-display function portion 122 may utilize physically separated processors (e.g., processors 106 and 110), physically separated I/O subsystem (e.g., I/O cards 102 and 112), and physically separated wirings within each portion 120 and 122 to enforce the segregation between the two portions 120 and 122, where the only share resources between them are the power supplies 114 and the data buses 104. Alternatively (or additionally), it is contemplated that the display control portion 120 and the non-display function portion 122 may share certain processors and/or I/O cards without departing from the broad scope of the inventive concepts disclosed herein, as long as logical separation can be maintained to minimize the impact of one portion over the other.

It is also contemplated that integrating the two portions 120 and 122 of the DPC 100 into a single LRU provides several advantages. For instance, the total number of LRUs required to host a given functionality may effectively be reduced, which may in turn also reduce the complexities associated with interconnecting such LRUs. In addition, it is contemplated that integrating the non-display function portion 122 with the display control portion 120 may allow the non-display function portion 122 to selectively activate display functions and non-display functions based on the location of the DPC 100, making the display control portion 120 and the non-display function portion 122 more versatile and better suited for handling critical applications than a typical IMA implementation, particularly under failure conditions.

Figure 2:
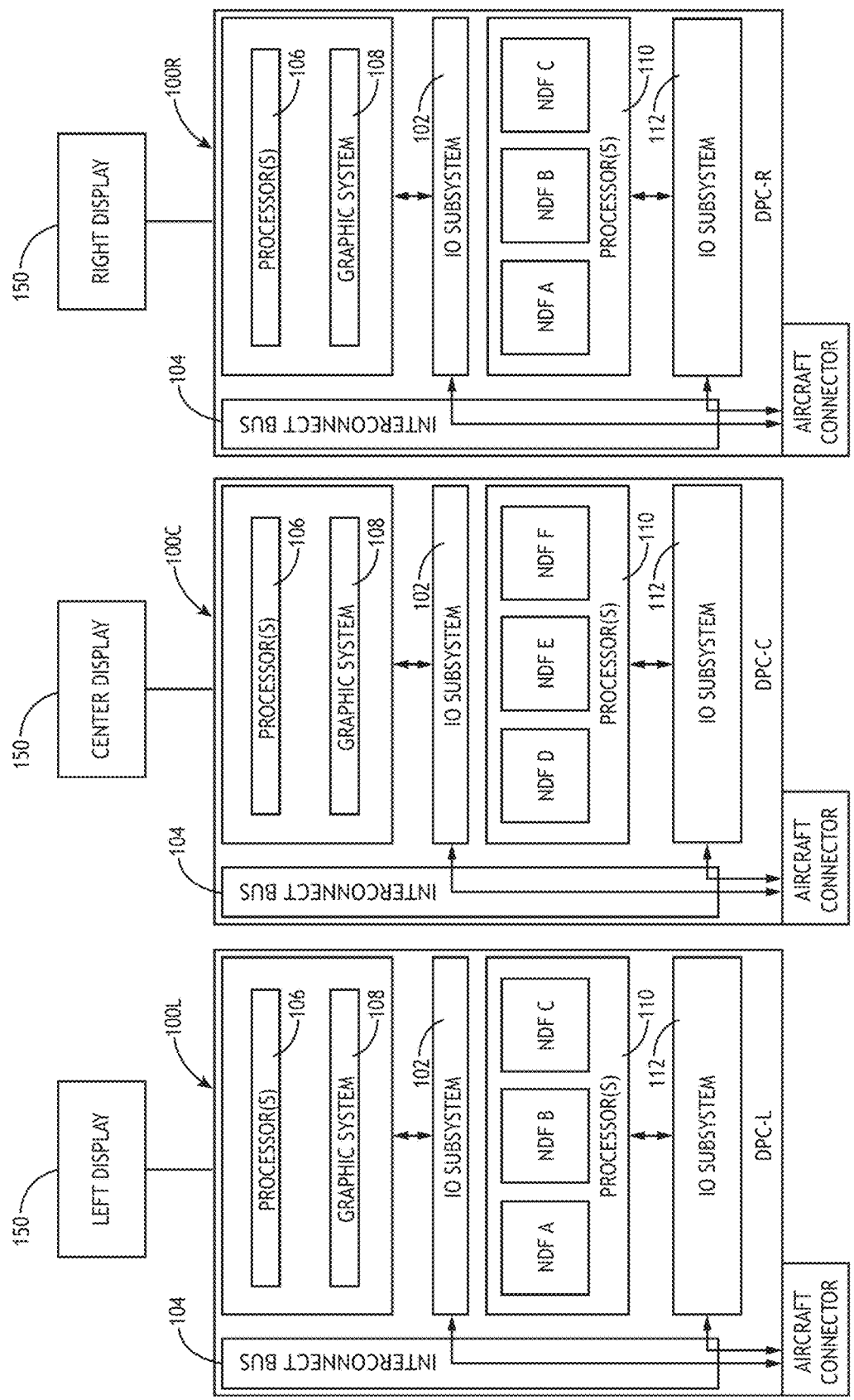
FIG. 2 is an illustration depicting location based allocations of functions across a plurality of display processing computers according to an exemplary embodiment of the inventive concepts disclosed herein.

For example, FIG. 2 shows location based allocations of functions across three exemplary DPCs 100 on board an aircraft. In certain implementations, the DPCs 100L, 100C, and 100R may be loaded with the same set of non-display functions, but only a subset of these functions may need to be actively engaged at a particular DPC depending on the location of that particular DPC. For instance, as shown in FIG. 2, both the DPC 100L and the DPC 100R may be configured to actively engage a subset of exemplary functions labeled non-display functions NDF A, B, and C, but the DPC 100C may be configured slightly differently to actively engage a different subset of exemplary functions labeled NDF D, E, and F instead.

Continuing with the example depicted in FIG. 2, suppose the DPC 100C is experiencing a failure and needs to be replaced. The line-replaceable nature of the DPC 100C may allow the user (e.g., the pilot) to simply remove the failed DPC 100C and replace it with another. For illustrative purposes, further suppose that no spare DPC is available onboard the aircraft to replace the failed DPC 100C, the user in this case may have the option to replace the failed DPC 100C with one of the DPCs 100L or 100R because they already have the functions loaded. The user may therefore simply insert one of the DPCs (e.g., 100R) into the slot previously occupied by the failed DPC 100C, and the relocation of the DPC 100R to the center may prompt the DPC 100R to activate the subset of functions previously provided by the DPC 100C, allowing the DPC 100R to serve as the new DPC 100C seamlessly.

It is to be understood that the location based selective activation of non-display functions described above is merely exemplary and is not meant to be limiting. It is contemplated that the DPC 100 may activate its non-display functions based on other operating conditions in addition to (or instead of) its location. For instance, if multiple DPCs onboard the aircraft have failed and the remaining DPCs do not have the capacity to maintain the same level of service, the remaining DPCs may deactivate some non-display functions and only keep the functions that are deemed critical actively engaged, as disclosed in U.S. patent application Ser. No. 14/298,275 filed on Jun. 6, 2014 and entitled "Enhanced Dispatch for Integrated Modular Avionics Solutions System and Related Method," which is incorporated herein by reference. It is contemplated that activation (or deactivation) of these non-display functions may be based on other operating conditions as well without departing from the broad scope of the inventive concepts disclosed herein.

It is also contemplated that by adding non-display functions to the DPC 100, a new solution is provided that may allow aircraft manufacturers to provide a platform with similar advantages of an IMA on aircraft that otherwise may not be able to support them. For instance, it may not be feasible for an aircraft manufacturer to upgrade both the display systems and the avionics platform for a particular aircraft due to constraints such as weight limit, space availability, power consumption, cost and other factors. By enabling the display system(s) to host the non-display functions (including IMA functions) in accordance with the inventive concepts disclosed herein, the functional requirements can be satisfied without any substantial increase in overall weight, size, power consumption, and cost.

Figure 3:
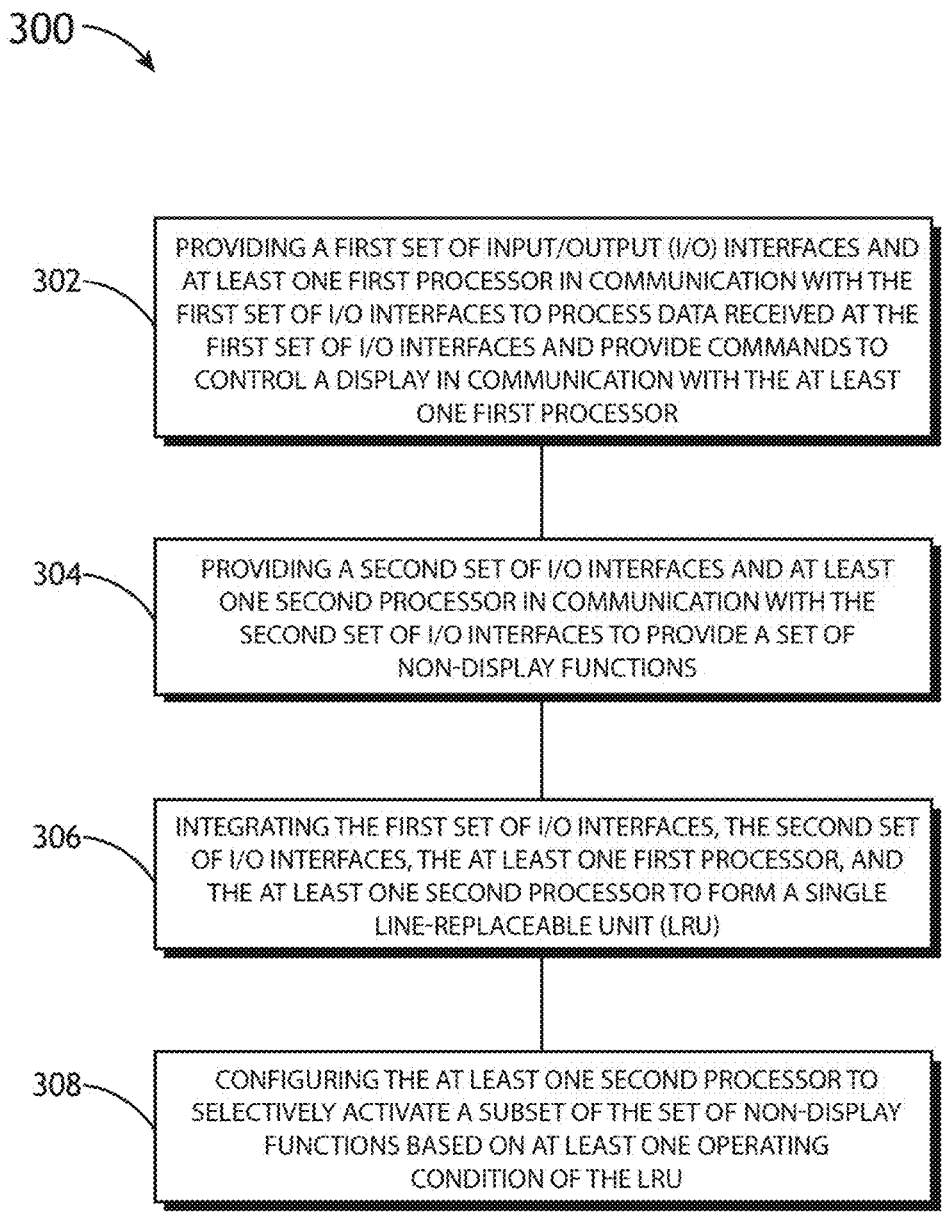
FIG. 3 is a flow diagram depicting a method for providing Integrated Modular Avionics (IMA) processing and input/output (I/O) capabilities to a display processing computer according to an exemplary embodiment of the inventive concepts disclosed herein.

Referring now to FIG. 3, a flow diagram depicting a method 300 that may be utilized to provide IMA processing and I/O capabilities to an aircraft is shown. More specifically, a first set of I/O interfaces and at least one first processor in communication with the first set of I/O interfaces may be provided in a step 302 to form a DPC that can be configured to control a display. A second set of I/O interfaces and at least one second processor in communication with the second set of I/O interfaces may be provided to the same DPC in a step 304, and the first set of I/O interfaces, the second set of I/O interfaces, the at least one first processor, and the at least one second processor in communication with the second set of I/O interfaces may all be integrated together to form a single line-replaceable unit in a step 306. As previously mentioned, the purpose of including the second set of I/O interfaces and at least one second processor as integrated components of the DPC is to provide the DPC with abilities to carry out both display functions and non-display functions. The processors may be configured to selectively activate certain display functions and/or non-display functions in a step 308. In certain implementations, the selection of the display functions and/or non-display functions may be determined based on operating conditions of the DPC, including its location, as previously described. It is noted, however, that the processors may use different criteria to select the display functions and the non-display functions.

It is to be understood that the specific references to aircraft and aircraft-specific functions in the examples above are merely exemplary and are not meant to be limiting. It is contemplated that various types of processing units and/or computers (not necessarily labeled as DPCs) onboard various types of vehicles, including airborne, land-based, and maritime vehicles, may be configured in manners similar to the DPC 100 disclosed herein without departing from the broad scope of the inventive concepts disclosed herein. It is also contemplated that computers configured as such may be utilized to support a variety of functions, including, but not limited to, the IMA functions previously mentioned in the examples above.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that the specific order or hierarchy of steps in the processes disclosed is an example of exemplary approaches. It is to be understood that the specific order or hierarchy of steps in the processes may be rearranged while remaining within the broad scope of the inventive concepts disclosed herein. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An avionics display system, comprising:
   a display installed onboard an aircraft; and
   a display processing computer configured to control the display, the display processing computer configured as a line-replaceable unit (LRU) onboard the aircraft, the display processing computer comprising:
      a first set of input/output (I/O) interfaces;
      a second set of I/O interfaces operationally separated from the first set of I/O interfaces;
      at least one first processor in communication with the first set of I/O interfaces and configured to process data received at the first set of I/O interfaces and provide commands to control the display; and
      at least one second processor in communication with the second set of I/O interfaces and configured to provide a set of non-display functions, and further configured to selectively activate a subset of the set of non-display functions based on a connection of the display processing computer with the display, wherein another subset of the set of non-display functions are selectively activated based on a connection of the display processing computer with a second display of the aircraft.

2. The display system of claim 1, wherein the first set of I/O interfaces and the second set of I/O interfaces are physically segregated within the LRU.

3. The display system of claim 1, wherein the at least one first processor and the at least one second processor are physically segregated within the LRU.

4. The display system of claim 1, wherein said at least one first processor is further configured to selectively activate a subset of a set of display functions on the display based on a connection of the display processing computer with the display.

5. The display system of claim 4, wherein said at least one first processor is further configured to selectively activate another subset of a set of display functions on the second display based on a connection of the display processing computer with the second display.

6. The display system of claim 1, wherein the subset of the set of non-display functions include flight deck access control, flight warning applications, or power management.

7. The display system of claim 1, wherein the display processing computer configured as the LRU has established a connection with the display when the LRU is installed.

8. The display system of claim 7, wherein the display processing computer configured as the LRU has established a connection with the second display when the LRU is removed from a connection with the first display and installed with the second display.

* * * * *